(12) United States Patent
Johansson et al.

(10) Patent No.: US 11,749,092 B2
(45) Date of Patent: Sep. 5, 2023

(54) OBJECT MANAGEMENT FOR VEHICLE LOADING

(71) Applicants: Ningbo Geely Automobile Research & Development Co., Ltd., Ningbo (CN); Zhejiang Geely Holding Group Co., Ltd., Zhejiang (CN)

(72) Inventors: Jonathan Johansson, Gothenburg (SE); Erik Lindberg Nilsson, Gothenburg (SE)

(73) Assignee: NINGBO GEELY AUTOMOBILE RESEARCH & DEVELOPMENT CO, Ningbo (CN)

( * ) Notice: Subject to any disclaimer, the term of this patent is extended or adjusted under 35 U.S.C. 154(b) by 0 days.

(21) Appl. No.: 17/839,072

(22) Filed: Jun. 13, 2022

(65) Prior Publication Data

US 2022/0309903 A1    Sep. 29, 2022

Related U.S. Application Data

(63) Continuation of application No. PCT/CN2020/134853, filed on Dec. 9, 2020.

(30) Foreign Application Priority Data

Dec. 19, 2019  (EP) ...................... 19218086

(51) Int. Cl.
*G08B 21/24*   (2006.01)
*B60Q 9/00*    (2006.01)
*B60R 1/22*    (2022.01)

(52) U.S. Cl.
CPC ............... *G08B 21/24* (2013.01); *B60Q 9/00* (2013.01); *B60R 1/22* (2022.01)

(58) Field of Classification Search
CPC .......... B60Q 9/00; G08B 21/24; G06Q 10/00; G06Q 10/08; G06Q 10/0832; G06Q 50/28; G06Q 50/30; B60R 1/22
See application file for complete search history.

(56) References Cited

U.S. PATENT DOCUMENTS

| 5,952,642 A | * | 9/1999 | Lutz | G07G 3/003 |
| | | | | 235/383 |
| 9,881,483 B2 | | 1/2018 | Jones | |

(Continued)

FOREIGN PATENT DOCUMENTS

| CN | 101937609 A | 1/2011 |
| CN | 104851252 A | 8/2015 |

(Continued)

OTHER PUBLICATIONS

International Search Report from International Application No. PCT/CN2020/134853 dated Mar. 10, 2021, 2 pages.

*Primary Examiner* — Omer S Khan
(74) *Attorney, Agent, or Firm* — TUCKER ELLIS LLP

(57) ABSTRACT

A method includes—responsive to activation of a vehicle for loading objects —detecting a first set of objects in vicinity of the vehicle, and—responsive to subsequent activation of the vehicle for relocation —detecting a second set of objects in vicinity of the vehicle. The method also include—responsive to a difference between the first and second sets of objects—issuing an indication for a user of the vehicle. The difference may, for example, relate to an added object, the added object being present in the second set of objects but not in the first set of objects. In some embodiments, objects may be excluded from consideration when a tracked location of the object indicates an increasing distance between the vehicle and the object. In some embodiments, objects that have an estimated size larger than a reference size may be excluded from consideration.

11 Claims, 3 Drawing Sheets

(56) References Cited

U.S. PATENT DOCUMENTS

| | | | |
|---|---|---|---|
| 9,984,571 B2 | 5/2018 | Sachdev | |
| 2014/0077988 A1* | 3/2014 | Saito | G01S 13/89 342/27 |
| 2015/0193996 A1* | 7/2015 | Van Wiemeersch | G06Q 20/00 340/5.72 |
| 2017/0263123 A1* | 9/2017 | Sachdev | G06V 20/52 |
| 2017/0344020 A1 | 11/2017 | Mannefred | |
| 2018/0197027 A1 | 7/2018 | Ali | |
| 2018/0255704 A1 | 9/2018 | Kamfors | |
| 2019/0064806 A1* | 2/2019 | Nix | B60W 50/00 |
| 2019/0248250 A1* | 8/2019 | Lyutskanov | B60L 53/60 |

FOREIGN PATENT DOCUMENTS

| | | |
|---|---|---|
| CN | 109102681 A | 12/2018 |
| CN | 109496186 A | 3/2019 |
| CN | 109532664 A | 3/2019 |
| JP | 2016157261 A | 9/2016 |
| WO | 2016103070 A1 | 6/2016 |

\* cited by examiner

OBJECT MANAGEMENT FOR VEHICLE LOADING

RELATED APPLICATION DATA

This application is a continuation of International Patent Application No. PCT/CN2020/134853, filed Dec. 9, 2020, which claims the benefit of European Patent Application No. 19218086.7, filed Dec. 19, 2019, the disclosures of which are incorporated herein by reference in their entireties.

TECHNICAL FIELD

The present disclosure relates generally to the field of vehicle loading. More particularly, it relates to management objects for loading into a vehicle.

BACKGROUND

When loading a vehicle it may occur that one or more objects to be loaded are temporarily placed on the ground (or in another location) in the vicinity of the vehicle. In some situations, it may be easy to forget loading such objects, and drive away while leaving the forgotten objects behind.

Example situations when it may be particularly easy to forget loading some objects include when visibility at the loading spot is poor and/or when conditions at the loading spot may incline the loading person to hurry up. Visibility may be poor, for example, due to darkness, or poor weather (e.g., rain, snow, fog, etc.). Conditions at the loading spot which may incline the loading person to hurry up include poor weather (e.g., cold weather, rain, snow, etc.), screaming children, high probability of crime, other stressful situations, etc.

U.S. Pat. No. 9,881,483 B2 describes a vehicle based system for management of personal items, wherein a characteristic of a journey is determined, a personal item is identified and its location is determined, and an indication is provided if the determined location is different than an expected location based on the characteristic of the vehicle journey. However, this approach would typically not provide an indication for items forgotten in a vicinity of the vehicle.

Therefore, there is a need for supporting approaches to vehicle loading. Preferably, such approaches improves (e.g., lowers) the probability of forgetting to load some objects before driving away.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a vehicle. The method may typically be a computer-implemented method.

The method comprises detecting a first set of objects in vicinity of the vehicle responsive to activation of the vehicle for loading of objects, and detecting a second set of objects in vicinity of the vehicle responsive to subsequent activation of the vehicle for relocation.

The method also comprises issuing an indication for a user of the vehicle responsive to a difference between the first and second sets of objects.

An advantage of this aspect is that the user of the vehicle, in association with putting the vehicle in motion, is made aware of differences to the environment of the vehicle compared to when loading was started. Thereby, the user may be guided to inspect the differences and act accordingly. This in turn may decrease the probability of forgetting to load some objects before driving away.

In some embodiments, the difference relates to an added object, wherein the added object is present in the second set of objects but not in the first set of objects.

An advantage of these embodiments is that the user is specifically made aware of objects which are particularly likely to constitute forgotten objects.

In some embodiments, the method further comprises tracking respective locations of objects in vicinity of the vehicle between activation of the vehicle for loading of objects and activation of the vehicle for relocation.

An advantage of these embodiments is that objects present in both of the first and second sets of objects, but in different locations, do not trigger issuance of the indication; thus potentially decreasing the number of false alarms.

In some embodiments, the method further comprises excluding any object present in the second set but not in the first set from consideration when the tracked respective location indicates an increasing distance between the vehicle and the object.

An advantage of these embodiments is that objects moving/moved away from the vehicle (which are not particularly likely to constitute forgotten objects) do not trigger issuance of the indication; thus potentially decreasing the number of false alarms.

In some embodiments, the method further comprises estimating a size of an object and excluding any object from consideration that has an estimated size larger than a reference size.

An advantage of these embodiments is that large objects (which are not particularly likely to constitute forgotten objects) do not trigger issuance of the indication; thus potentially decreasing the number of false alarms.

In some embodiments, the method further comprises detecting animal features and excluding any object from consideration that is considered to be an animal.

An advantage of these embodiments is that animals (which are not particularly likely to constitute forgotten objects) do not trigger issuance of the indication; thus potentially decreasing the number of false alarms.

In some embodiments, the method further comprises detecting human features and excluding any object from consideration that is considered to be a human.

An advantage of these embodiments is that humans (which are not particularly likely to constitute forgotten objects) do not trigger issuance of the indication; thus potentially decreasing the number of false alarms.

A second aspect is a computer program comprising program instructions. The computer program is loadable into a data processing unit and configured to cause execution of the method according to the first aspect when the computer program is run by the data processing unit.

An advantage of this aspect is that a software implementation is provided of the method according to the first aspect.

A third aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

An advantage of this aspect is that a carrier is provided for the software implementing the method of the first aspect.

A fourth aspect is a control unit for a vehicle. The control unit is configured to cause execution of the method according to the first aspect.

An advantage of this aspect is that a hardware implementation is provided of the method according to the first aspect.

A fifth aspect is an apparatus for a vehicle. The apparatus comprises controlling circuitry.

The controlling circuitry is configured to cause (responsive to activation of the vehicle for loading of objects) detection of a first set of objects in vicinity of the vehicle, and (responsive to subsequent activation of the vehicle for relocation) detection of a second set of objects in vicinity of the vehicle.

The controlling circuitry is also configured to cause (responsive to a difference between the first and second sets of objects) issuing of an indication for a user of the vehicle.

An advantage of this aspect is that a physical apparatus is provided that enables decrease of the probability of forgetting to load some objects before driving away.

A sixth aspect is a system for a vehicle. The system comprises one or more sensors mountable on the vehicle and configured to detect objects in vicinity of the vehicle, a user interface mountable in the vehicle, and processing circuitry.

The processing circuitry is configured to (responsive to activation of the vehicle for loading of objects) control the one or more sensors to detect a first set of objects in vicinity of the vehicle, and (responsive to subsequent activation of the vehicle for relocation) control the one or more sensors to detect a second set of objects in vicinity of the vehicle.

The processing circuitry is also configured to (responsive to a difference between the first and second sets of objects) control the user interface to issue an indication.

An advantage of this aspect is that a system is provided which is suitable for mounting in a vehicle, and that enables decrease of the probability of forgetting to load some objects before driving away.

A seventh aspect is a vehicle comprising one or more of: the control unit of the fourth aspect, the apparatus of the fifth aspect, and the system of the sixth aspect.

An advantage of this aspect is that a vehicle is provided that enables decrease of the probability of forgetting to load some objects before driving away.

In some embodiments, any of the above aspects may additionally have features identical with or corresponding to any of the various features as explained above for any of the other aspects.

A general advantage of some embodiments is that supporting approaches to vehicle loading are provided, which may improve (e.g., lower) the probability of forgetting to load some objects before driving away.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where supporting approaches to vehicle loading are provided, which may improve (e.g., lower) the probability of forgetting to load some objects before driving away.

Some embodiments uses parking sensors to avoid forgetting objects. Parking sensors are typically configured to detect and warn for items that you may hit with a vehicle when driving. For example, if there is an item behind the vehicle when the vehicle starts reversing, a warning may be issued. On the other hand, no warning is typically issued if there is an item behind the vehicle when the car starts driving forward. Some embodiments suggest using existing parking sensors and/or warning systems, to also detect and warn for forgotten items around the vehicle; regardless of the direction of movement of the vehicle.

Figure 1:
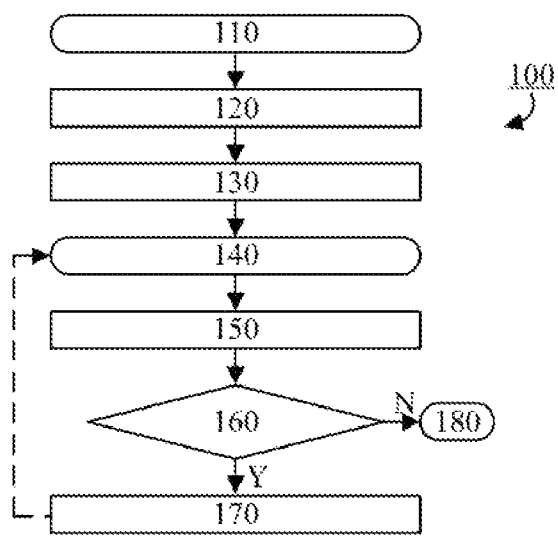
FIG. 1 is a flowchart illustrating example method steps according to some embodiments.

FIG. 1 illustrates an example method 100 according to some embodiments. The method 100 is for a vehicle and may be a computer-implemented method.

Step 110 illustrates the event of activation of the vehicle for loading of objects. This activation may, for example, comprise one or more of: unlocking the vehicle, unlocking the trunk of the vehicle, opening the trunk of the vehicle, opening a door of the vehicle, a key (or other unlocking device) being in a vicinity of the vehicle, etc.

Responsive to the activation of the vehicle for loading of objects in step 110, a first set of objects in the vicinity of the vehicle is detected in step 120. Typically, the detection is implemented using image sensors and/or distance sensors (e.g., cameras, parking sensors, etc.) and image recognition hardware and/or software.

Generally, it should be understood that image recognition may comprise identifying a type of object (e.g., a bag, a suitcase, a cat, etc.), and or associating each object with a unique object identifier (e.g., telling two bags apart).

Step 130 illustrates a duration of time after the activation of the vehicle for loading of objects and before a subsequent activation of the vehicle for relocation. In this duration of time vehicle loading may occur.

Generally, vehicle loading may comprise bringing objects into a vicinity of the vehicle, possibly temporarily placing objects on the ground (or in another location) in the vicinity of the vehicle, and placing objects within—or on—the vehicle (e.g., in the trunk, in a passenger seat, in the backseat, on the floor of the vehicle compartment, in a roof box, on a roof rail, etc.). In this context, a trailer or similar loading is to be understood as being considered part of the vehicle according to some embodiments.

Step 140 illustrates the event of activation of the vehicle for relocation, subsequently to the event of activation of the vehicle for loading of objects. This activation may, for example, comprise one or more of: closing the trunk of the vehicle, closing door(s) of the vehicle, starting the engine of the vehicle, putting the vehicle into gear, putting the vehicle into motion, etc.

Responsive to the activation of the vehicle for relocation in step 140, a second set of objects in the vicinity of the vehicle is detected in step 150. Typically, the detection is implemented using image sensors and/or distance sensors (e.g., cameras, parking sensors, etc.) and image recognition hardware and/or software.

In step 160, it is determined whether there is any difference between the first and second sets of objects, and possibly also the nature of the difference. The determination of step 160 may be performed by computer comparison of the first and second sets of objects.

A difference may, for example, be one or more of: that an object is present in the second set of objects but not in the first set of objects (an added object), that an object is present in the first set of objects but not in the second set of objects (a removed object), and that an object is present in both the first set of objects and in the second set of objects—but in different locations (a moved, or relocated, object).

If there is no difference (N-path out of step 160), no actions are taken and the method ends as illustrated by step 180.

If there is a difference, the method may—possibly depending on the type of difference—proceed to step 170 (Y-path out of step 160), where an indication is issued for a user of the vehicle (e.g., a driver/passenger/occupant/owner/etc.). The indication is typically for informing the user that there is a difference between the first and second sets of objects; and possibly what the difference is.

When the method does not proceed to step 170, it is typically ended by taking no actions proceeding to step 180 (N-path out of step 160).

In some embodiments, another indication is issued for the user of the vehicle before ending the process in step 180. The other indication is typically for informing the user that there is no relevant difference between the first and second sets of objects. Thereby, the user may be explicitly informed, for example, that no objects have been forgotten.

In a typical example, the method proceeds to step 170, at least, when the difference relates to an added object (i.e., when a comparison of the first and second sets of objects identifies an added object). In some embodiments, the method proceeds to step 170 only when the difference relates to an added object.

The indication issued in step 170 may be any suitable indication inclining the user to double-check the vicinity of the vehicle and load any forgotten objects. The indication may be one or more of a visual indication, an audible indication, or a tactile indication, for example.

For example, issuing an indication may comprise sending a signal to a rendering device, causing the rendering device to alert the user accordingly. The indication may be rendered by one or more of: an instrument panel, a screen of a vehicle computer, a mobile terminal, a vehicle key device, an infotainment system of the vehicle, a vehicle horn, vehicle external/internal lighting, vibration means for the steering wheel, etc.

In a typical example, a camera view of surroundings of the vehicle is displayed to the user, wherein the camera view is augmented to highlight added object(s), thereby guiding the user to the location of the added object(s). The augmented camera view may be combined with a tactile alert message and/or an audible alert signal. Alternatively or additionally, the augmented camera view may be combined with an alerting voice message and/or an alerting text message, any of which suggesting loading of the highlighted added object(s), thereby guiding the user to avoid forgetting the added object(s) when the vehicle is driven away.

After step 170 (e.g., when a detection is made indicating that a user has considered loading of—or has loaded—additional objects), the method may return to step 140, where a third set of objects may be detected responsive to a yet subsequent activation of the vehicle for relocation.

Reaching step 160 again, the method may comprise determining whether there is any difference between the first and third sets of objects, and proceeding accordingly as described above. If, in this case, another indication is issued for the user of the vehicle before ending the process in step 180, this other indication typically provides information to the user that user actions having been taken where successful. Thereby, the indication of step 170 and the other indication may be seen as a sequence of indications, which together guides the user to avoid forgetting the added object(s) when the vehicle is driven away.

Example detections indicating that a user has considered loading of—or has loaded—additional objects may include one or more of: re-opening the trunk of the vehicle, re-opening door(s) of the vehicle, stopping the engine of the vehicle, putting the vehicle out of gear, halting motion of the vehicle, etc. Alternatively or additionally, the method may return to step 140 responsive to a user input confirming that loading is complete.

Generally, a vicinity of the vehicle may be defined in any suitable way. For example, the vicinity may be defined in terms of a maximum distance from the vehicle and/or in terms of specified direction(s) from the vehicle. Alternatively or additionally, the vicinity may be defined in terms of a coverage area of the sensors used in steps 120 and 150.

Figure 2:
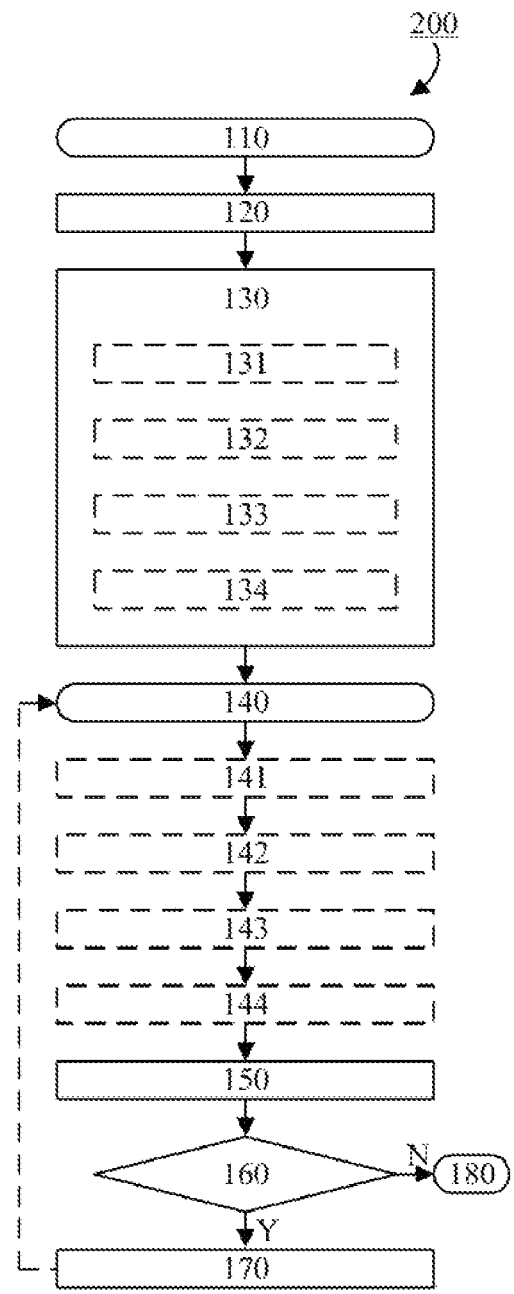
FIG. 2 is a flowchart illustrating example method steps according to some embodiments.

FIG. 2 illustrates an example method 200 according to some embodiments. The method 200 is an exemplification of various options for the method 100 of FIG. 1. Steps 110, 120, 140, 150, 160, 170, and 180 of the method 200 are equivalent (or at least very similar) to the corresponding steps of the method 100 of FIG. 1, and will not be detailed again in relation to FIG. 2.

FIG. 2 illustrates how various optional measures may be taken to improve the accuracy of the indication issuing (e.g., reducing the number of false alarms). It should be understood that these measures may be used alone or in any combination.

A first measure is illustrated by sub-step 131, wherein respective locations of objects in the vicinity of the vehicle are tracked between activation of the vehicle for loading of objects (step 110) and activation of the vehicle for relocation (step 140). Tracking of the respective locations may be implemented in any suitable way. For example, the sensors and image recognition may be used to repetitively determine sets of objects, wherein each object is associated with an object identifier and a location.

The tracking of object location(s) enables exclusion of objects which are not likely to be forgotten objects from consideration for indication issuing, thereby improve the accuracy of the indication issuing.

For example, an object present in both the first and second sets, but in different locations, may be identified via the object tracking and need not give rise to a false alarm. Examples of such objects include a moving animal, a person walking by, debris (e.g., moved by wind), etc.

Optional step 141 illustrates an alternative or additional use for the object tracking, wherein any object present in the second set but not in the first set is excluded from consideration when the tracked respective location indicates an increasing distance between the vehicle and the object. Examples of such objects include an animal not present when step 120 was executed.

A second measure is illustrated by sub-step 132, wherein respective sizes of objects in the vicinity of the vehicle are estimated. Size estimation may be implemented in any suitable way. For example, the sensors and image recognition may be used to determine a plausible size; in one, two or three dimensions.

The size estimation enables exclusion of objects which are not likely to be forgotten objects from consideration for indication issuing, thereby improve the accuracy of the indication issuing.

Optional step 142 illustrates that objects that has an estimated size larger than a reference size may be excluded from consideration. Examples of such objects include other vehicles, buildings, rocks, trees and bushes, etc. The reference size may be set according to any suitable criteria; in one, two or three dimensions. For example, the reference size may correspond to a size of a loading space of the vehicle (e.g., the trunk) and/or a size of a loading orifice of the vehicle.

A third measure is illustrated by sub-steps 133 and 134, wherein animal/human features are detected for objects in the vicinity of the vehicle. Such detection may be implemented in any suitable way. For example, the sensors and image recognition may be used to determine whether an object is likely an animal/human based on appearance, movement, etc.

The animal/human recognition enables exclusion of objects which are not likely to be forgotten objects from consideration for indication issuing, thereby improve the accuracy of the indication issuing.

Optional steps 143 and 144 illustrate that objects that are considered as an animal/human may be excluded from consideration.

It should be noted, that in some scenarios it may be desirable to not exclude animals/humans from consideration. For example, pets or children might be at risk to be forgotten when driving away, and a vehicle user might benefit from considering animals and/or humans as objects considered for indication issuance. To this end, some embodiments may comprise a possibility to enable/disable the features of excluding animals and/or humans from consideration.

Alternatively or additionally, some embodiments may comprise distinguishing between wild animals and pet animals and exclude only wild animals from consideration. Thus, in such embodiments, an indication for a user of the vehicle is issued when the difference between the first and second sets of objects relates to a pet animal, but not when the difference relates to a wild animal.

Distinguishing between wild animals and pet animals may be implemented in any suitable way. For example, an image recognition algorithm may be applied to classify an animal as being of a species (e.g., cat, snake, etc.) and map the species to either the category "wild animal" or "pet animal" based on a species look-up table specifying appropriate mappings for a plurality of species.

In some embodiments, an animal may be determined as "wild animal" when it is not possible to make a clear distinction (e.g., when a probability of the distinction being wrong is higher than a threshold value). This may occur, for example, when an image recognition algorithm cannot conclusively classify the animal as being of a species and/or when the species is not present in the look-up table or has dual mappings in the look-up table (e.g., a bird may be a wild animal or a pet animal).

Alternatively or additionally, other attributes may be evaluated together with the animal when it is not possible to make a clear distinction from the animal alone. For example, a bird or a rat may be determined as "pet animal" when it is within a cage, and as a "wild animal" otherwise, a dog-like animal may be determined as a "pet animal" when it has a collar, and as a "wild animal" otherwise, etc.

Figure 3:
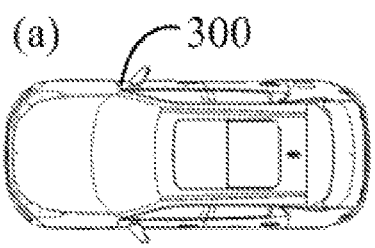
FIG. 3 is a schematic drawing illustrating an example loading scenario according to some embodiments.
Figure 3:
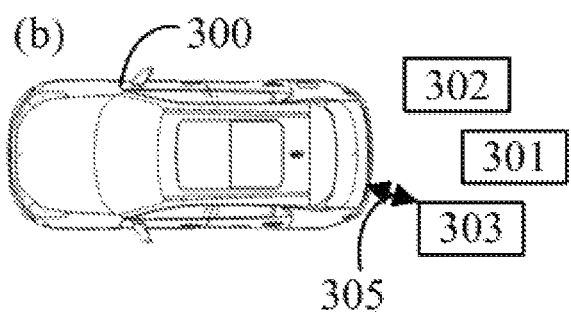
Figure 3:
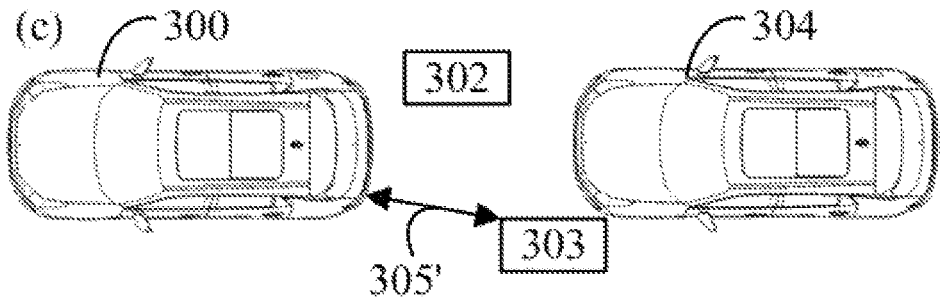
Figure 3:
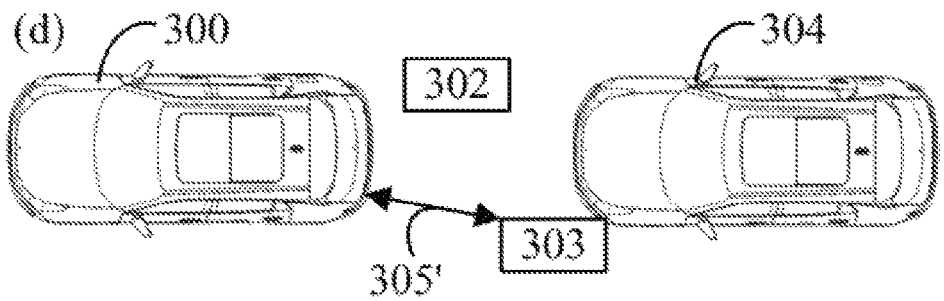

FIG. 3 schematically illustrates an example scenario of loading a vehicle 300 according to some embodiments.

Part (a) illustrates the event of activation of the vehicle for loading of objects (compare with step 110 of FIGS. 1 and 2), and detection of the first set of objects in the vicinity of the vehicle (compare with step 120 of FIGS. 1 and 2). In this scenario, the first set of objects is empty.

Parts (b) and (c) illustrates the duration of time after the activation of the vehicle for loading of objects and before a subsequent activation of the vehicle for relocation (compare with step 130 of FIGS. 1 and 2).

In part (b), two objects (e.g., bags) 301, 302 have been temporarily put on the ground in the vicinity of the vehicle. Furthermore, another object (e.g., a piece of plastic or a pigeon) 303 has entered into the vicinity of the vehicle and is at a distance 305 from the vehicle.

In part (c), the object 301 has been loaded into the vehicle but the object 302 remains on the ground in the vicinity of the vehicle. The object 303 has relocated to further away and is now at a distance 305' from the vehicle. Furthermore, another vehicle 304 have been parked in the vicinity of the vehicle 300.

Part (d) illustrates the event of activation of the vehicle for relocation (compare with step 140 of FIGS. 1 and 2), and detection of the second set of objects in the vicinity of the vehicle (compare with step 150 of FIGS. 1 and 2). In this scenario, the second set is made up of the object 302 (e.g., a forgotten bag), the object 303 (irrelevant object), and the other vehicle 304 (irrelevant object).

Since the first set of objects was empty, all of the objects 302, 303, 304 may be considered as added objects and may lead to issuing of an indication.

If size estimation is employed as described above, the other vehicle 304 would be excluded from consideration and would not lead to issuing of an indication. If location tracking and/or animal recognition is employed as described above, the irrelevant object 303 might be excluded from consideration and might not lead to issuing of an indication.

Figure 4:
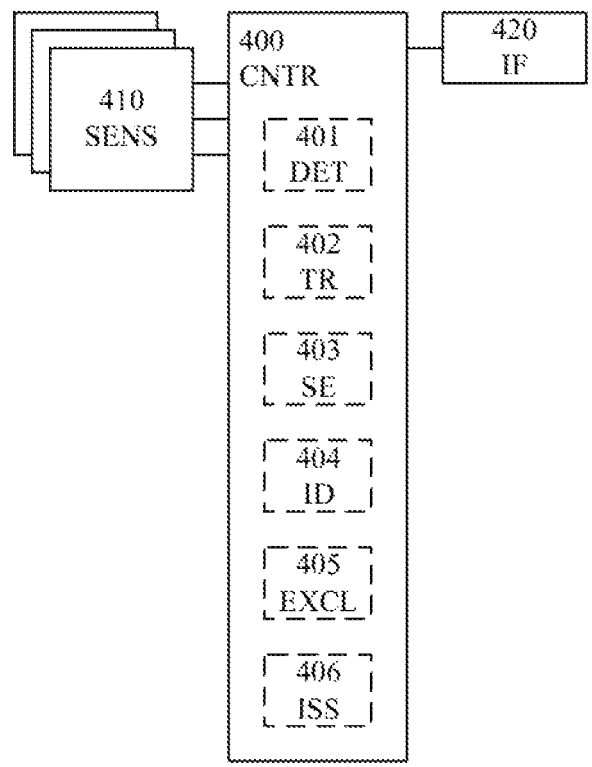
FIG. 4 is a schematic block diagram illustrating an example system according to some embodiments.

FIG. 4 schematically illustrates an example system according to some embodiments. The example system is for installation in a vehicle.

The system comprises one or more sensors (SENS) 410 mountable on the vehicle and configured to detect objects in vicinity of the vehicle. For example, the sensors may be image sensors and/or distance sensors (e.g., cameras, parking sensors, etc.).

The system comprises a user interface (IF) 420 mountable in the vehicle. The user interface may be any suitable rendering device as exemplified earlier herein.

The system also comprises a controller (CNTR; e.g., controlling/processing circuitry, a control module, or a control unit) 400. The controller may be configured to receive input from—and possibly provide control output to—the sensors 410 and to provide output to the user interface 420. Furthermore, the controller may be configured to receive input form one or more other devices indicating activation of the vehicle for loading of objects, activation of the vehicle for relocation, etc. The controller may be comprised in an apparatus according to some embodiments.

The controller is configured to cause detection of a first set of objects in vicinity of the vehicle responsive to activation of the vehicle for loading of objects (compare with step 120 of FIGS. 1 and 2). The controller is also configured to cause detection of a second set of objects in vicinity of the vehicle responsive to activation of the vehicle for relocation (compare with step 150 of FIGS. 1 and 2).

To this end, the controller may comprise or be otherwise associated with (e.g., connected, or connectable, to) a determiner (DET; e.g., determining circuitry or a determination module) 401. The determiner may be configured to detect the first and second sets of objects in vicinity of the vehicle. For example, the determiner may comprise image recognition hardware and/or software.

The determiner may be comprised in the sensors according to some embodiments. The controller may be configured to control the one or more sensors to detect the first and second sets of objects in vicinity of the vehicle (e.g., by control signaling).

The controller is also configured to cause issuing of an indication for a user of the vehicle responsive to a difference between the first and second sets of objects (compare with step 170 of FIGS. 1 and 2).

To this end, the controller may comprise or be otherwise associated with (e.g., connected, or connectable, to) an issuer (ISS; e.g., issuing circuitry or an issuance module) 406. The issuer may be configured to issue the indication for the user of the vehicle.

The issuer may be comprised in the user interface according to some embodiments. The controller may control the user interface to issue the indication.

The controller may be further configured to cause tracking of respective locations of objects in vicinity of the vehicle between activation of the vehicle for loading of objects and activation of the vehicle for relocation (compare with sub-step 131 of FIG. 2).

To this end, the controller may comprise or be otherwise associated with (e.g., connected, or connectable, to) a tracker (TR; e.g., tracking circuitry or a tracking module) 402. The tracker may be configured to track respective locations of objects in vicinity of the vehicle.

The controller may be further configured to cause estimation of a size of an object (compare with sub-step 132 of FIG. 2).

To this end, the controller may comprise or be otherwise associated with (e.g., connected, or connectable, to) a size estimator (SE; e.g., size estimating circuitry or a size estimation module) 403. The size estimator may be configured to estimate the size of an object.

The controller may be further configured to cause detection (identification) of animal and/or human features (compare with sub-steps 133 and 134 of FIG. 2).

To this end, the controller may comprise or be otherwise associated with (e.g., connected, or connectable, to) an identifier (ID; e.g., identifying circuitry or an identification module) 404. The identifier may be configured to identify animal and/or human features.

The controller may be further configured to cause exclusion of any object present in the second set but not in the first set from consideration when the tracked respective location indicates an increasing distance between the vehicle and the object (compare with step 141 of FIG. 2).

The controller may be further configured to cause exclusion of any object from consideration that has an estimated size larger than a reference size (compare with step 142 of FIG. 2).

The controller may be further configured to cause exclusion of any object from consideration that is considered to be an animal or a human (compare with steps 143 and 144 of FIG. 2).

To this end, the controller may comprise or be otherwise associated with (e.g., connected, or connectable, to) an excluder (EXCL; e.g., excluding circuitry or an exclusion module) 405. The excluder may be configured to exclude any object as defined above.

Figure 5:
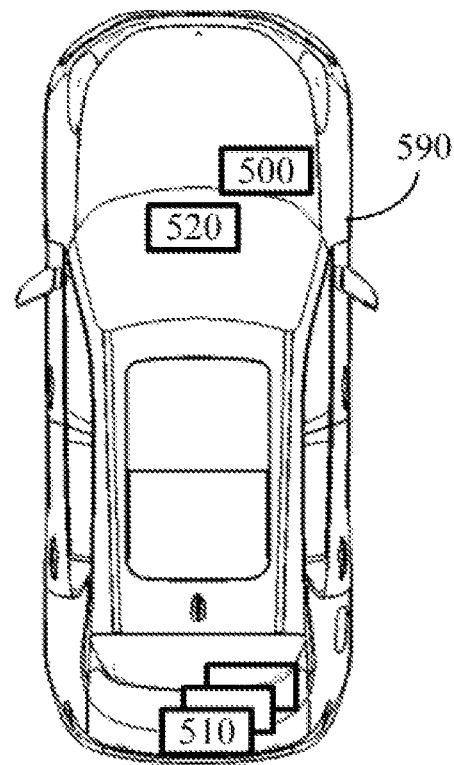
FIG. 5 is a schematic drawing illustrating an example vehicle according to some embodiments.

FIG. 5 schematically illustrates an example vehicle 590 according to some embodiments. The vehicle comprises one or more sensors 510 (compare with the sensors 410 of FIG. 4), a user interface 520 (compare with the user interface 420 of FIG. 4), and a controller 500 (compare with the controller 400 of FIG. 4).

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a vehicle computer or a vehicle.

Embodiments may appear within an electronic apparatus comprising arrangements, circuitry, and/or logic according to any of the embodiments described herein. Alternatively or additionally, an electronic apparatus may be configured to perform methods according to any of the embodiments described herein.

Figure 6:
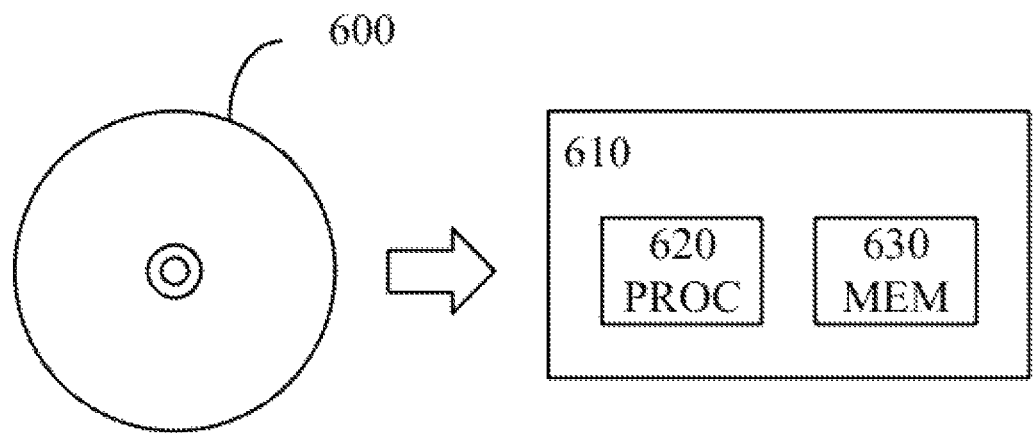
FIG. 6 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in a vehicle 610. When loaded into the data processor, the computer program may be stored in a memory (MEM) 630 associated with or comprised in the data processor. According to some embodiments, the computer program may, when loaded into and run by the data processor, cause execution of method steps according to, for example, any of the methods illustrated in FIGS. 1 and 2, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for assisting a user load objects into a vehicle, the method comprising:
responsive to activation of the vehicle for loading of objects, detecting a first set of objects in a vicinity of the vehicle, wherein each object in the first set of objects is located outside the vehicle and placed on the ground surrounding the vehicle;
responsive to subsequent activation of the vehicle for relocation, detecting a second set of objects in the vicinity of the vehicle, wherein each object in the second set of objects is located outside the vehicle and placed on the ground surrounding the vehicle;
responsive to determining a difference in the objects belonging to the first set of objects and the objects belonging to the second set of objects, issuing an indication for a user of the vehicle;
tracking respective locations of the objects in the first and second sets of objects in a time period between activation of the vehicle for loading of objects and activation of the vehicle for relocation; and
excluding from the determining of the difference any object present in the second set but not in the first set from consideration upon determining that the tracked respective location indicates an increasing distance between the vehicle and the object.

2. The method of claim 1, wherein the difference relates to an added object that is present in the second set of objects but not in the first set of objects.

3. The method of claim 1, further comprising estimating a respective size of the objects in the first and second sets of objects and excluding any object from the determining of the difference that has an estimated size larger than a reference size.

4. The method of claim 1, further comprising detecting animal features and excluding any object from the determining of the difference that is considered to be an animal.

5. The method of claim 1, further comprising detecting human features and excluding any object from the determining of the difference that is considered to be a human.

6. A loading assistance apparatus for a vehicle, the loading assistance apparatus comprising controlling circuitry configured to cause:
responsive to activation of the vehicle for loading of objects, detection of a first set of objects in a vicinity of the vehicle, wherein each object in the first set of objects is located outside the vehicle and placed on the ground surrounding the vehicle;
responsive to subsequent activation of the vehicle for relocation, detection of a second set of objects in the vicinity of the vehicle, wherein each object in the second set of objects is located outside the vehicle and placed on the ground surrounding the vehicle;
responsive to determining a difference in the objects belonging to the first set of objects and the objects belonging to the second set of objects, issuing of an indication for a user of the vehicle;
tracking respective locations of the objects in the first and second sets of objects in a time period between activation of the vehicle for loading of objects and activation of the vehicle for relocation; and
excluding from the determining of the difference any object present in the second set but not in the first set from consideration upon determining that the tracked respective location indicates an increasing distance between the vehicle and the object.

7. The loading assistance apparatus of claim 6, wherein the difference relates to an added object that is present in the second set of objects but not in the first set of objects.

8. The loading assistance apparatus of claim 6, wherein the controlling circuitry is further configured to estimate a respective size the objects in the first and second sets of objects and exclude any object from the determining of the difference that has an estimated size larger than a reference size.

9. The loading assistance apparatus of claim 6, further comprising:
one or more sensors mountable on the vehicle and configured to detect objects in vicinity of the vehicle.

10. The loading assistance apparatus of claim 6, further comprising a user interface mountable in the vehicle.

11. A vehicle comprising controlling circuitry configured to cause:
responsive to activation of the vehicle for loading of objects, detection of a first set of objects in a vicinity of the vehicle, wherein each object in the first set of objects is located outside the vehicle and placed on the ground surrounding the vehicle;
responsive to subsequent activation of the vehicle for relocation, detection of a second set of objects in the vicinity of the vehicle, wherein each object in the second set of objects is located outside the vehicle and placed on the ground surrounding the vehicle;

responsive to determining a difference in the objects belonging to the first set of objects and the objects belonging to the second set of objects, issuing of an indication for a user of the vehicle;

tracking respective locations of the objects in the first and second sets of objects in a time period between activation of the vehicle for loading of objects and activation of the vehicle for relocation; and excluding from the determining of the difference any object present in the second set but not in the first set from consideration upon determining that the tracked respective location indicates an increasing distance between the vehicle and the object.

\* \* \* \* \*